US009077460B2

(12) United States Patent
Ramanathan et al.

(10) Patent No.: US 9,077,460 B2
(45) Date of Patent: Jul. 7, 2015

(54) SYSTEMS AND METHODS FOR MEASURING INTEREST LEVELS OF AUDIENCE IN BROADCAST PROGRAM AND PROVIDING INFORMATION BASED ON THE INTEREST LEVELS

(75) Inventors: Krishnan Ramanathan, Karnataka (IN); Gokul Ranganathan, Karnataka (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2122 days.

(21) Appl. No.: 11/918,353

(22) PCT Filed: Oct. 31, 2005

(86) PCT No.: PCT/IN2005/000350
§ 371 (c)(1),
(2), (4) Date: Oct. 12, 2007

(87) PCT Pub. No.: WO2006/114796
PCT Pub. Date: Nov. 2, 2006

(65) Prior Publication Data
US 2009/0293080 A1    Nov. 26, 2009

(30) Foreign Application Priority Data

Apr. 25, 2005 (WO) .................. PCT/IN2005/000124
Sep. 27, 2005 (WO) .................. PCT/IN2005/000325

(51) Int. Cl.
*H04N 7/16* (2011.01)
*H04H 20/28* (2008.01)
(Continued)

(52) U.S. Cl.
CPC ............... *H04H 20/28* (2013.01); *H04H 60/73* (2013.01); *H04H 60/61* (2013.01);
(Continued)

(58) Field of Classification Search
CPC .................... H04N 21/4532; H04N 21/25891;
H04N 21/44213; H04N 21/434; H04N
21/4722; H04N 21/258; H04N 21/4508;
H04N 21/4755; H04H 60/73; H04H 60/61;
H04H 20/28; H04H 2201/30; H04H 60/33;
H04H 20/30; H04H 20/38; H04H 60/66;
H04H 60/74; H04H 60/94; H04H 2201/20;
G02B 6/29374
USPC ................. 725/9, 12, 20, 40, 46, 62; 348/563
See application file for complete search history.

(56) References Cited

U.S. PATENT DOCUMENTS 3,576,391 A    4/1971    Houghton
4,025,851 A    5/1977    Haselwood et al.
(Continued)

FOREIGN PATENT DOCUMENTS

EP    0 113 436    7/1984
FR    2 780 228    12/1999
(Continued)

OTHER PUBLICATIONS

AGB Italia, "The System>The Peoplemeter" webpage, 2003.
(Continued)

*Primary Examiner* — Hoang-Vu A Nguyen-Ba
(74) *Attorney, Agent, or Firm* — Hewlett-Packard Patent Department

(57) ABSTRACT

A system measures interest levels of audience in a broadcast program and provides extra information based on the interest level. The system receives an AV signal of a broadcast program and supplementary content which contains broadcast program related information and a tag identifying the broadcast program. The supplementary content is combined with the AV signal to form a data-augmented signal which is subsequently modulated with a carrier signal to form a transmit signal for broadcasting to receivers. Each receiver extracts the supplementary content, computes interest levels and provides extra information based on the interest levels.

21 Claims, 8 Drawing Sheets

(51) Int. Cl.

| | | |
|---|---|---|
| *H04H 60/73* | (2008.01) | |
| *H04H 60/61* | (2008.01) | |
| *H04N 21/45* | (2011.01) | |
| *H04N 21/258* | (2011.01) | |
| *H04N 21/442* | (2011.01) | |
| *H04N 21/434* | (2011.01) | |
| *H04N 21/4722* | (2011.01) | |
| *H04N 21/475* | (2011.01) | |
| *G02B 6/293* | (2006.01) | |
| *H04H 60/33* | (2008.01) | |
| *G06F 3/00* | (2006.01) | |
| *H04N 5/445* | (2011.01) | |
| *H04H 20/30* | (2008.01) | |
| *H04H 20/38* | (2008.01) | |
| *H04H 20/91* | (2008.01) | |
| *H04H 60/66* | (2008.01) | |
| *H04H 60/74* | (2008.01) | |
| *H04H 60/94* | (2008.01) | |

(52) U.S. Cl.
CPC .... *H04N 21/4532* (2013.01); *H04N 21/25891* (2013.01); *H04N 21/44213* (2013.01); *H04N 21/434* (2013.01); *H04N 21/4722* (2013.01); *H04N 21/258* (2013.01); *H04N 21/4508* (2013.01); *H04N 21/4755* (2013.01); *G02B 6/29374* (2013.01); *H04H 20/30* (2013.01); *H04H 20/38* (2013.01); *H04H 20/91* (2013.01); *H04H 60/33* (2013.01); *H04H 60/66* (2013.01); *H04H 60/74* (2013.01); *H04H 60/94* (2013.01); *H04H 2201/20* (2013.01); *H04H 2201/30* (2013.01)

(56) References Cited

U.S. PATENT DOCUMENTS

| | | | |
|---|---|---|---|
| 4,694,490 | A | 9/1987 | Harvey et al. |
| 4,811,103 | A | 3/1989 | Casey |
| 4,908,761 | A | 3/1990 | Tai |
| 4,926,255 | A | 5/1990 | Von Kohorn |
| 5,014,125 | A | 5/1991 | Pocock et al. |
| 5,119,507 | A | 6/1992 | Mankovitz |
| 5,128,752 | A | 7/1992 | Von Kohorn |
| 5,177,485 | A | 1/1993 | Daniel et al. |
| 5,227,874 | A | 7/1993 | Von Kohorn |
| 5,249,044 | A | 9/1993 | Von Kohorn |
| 5,287,181 | A | 2/1994 | Holman |
| 5,343,239 | A | 8/1994 | Lappington et al. |
| 5,374,951 | A | 12/1994 | Welsh |
| 5,481,294 | A * | 1/1996 | Thomas et al. ................. 725/20 |
| 5,488,423 | A | 1/1996 | Walkingshaw et al. |
| 5,579,055 | A | 11/1996 | Hamilton et al. |
| 5,584,051 | A | 12/1996 | Goken |
| 5,734,413 | A | 3/1998 | Lappington et al. |
| 5,737,595 | A | 4/1998 | Cohen et al. |
| 5,759,101 | A | 6/1998 | Von Kohorn |
| 5,903,262 | A | 5/1999 | Ichihashi et al. |
| 5,990,927 | A | 11/1999 | Hendricks et al. |
| 6,014,688 | A | 1/2000 | Venkatraman et al. |
| 6,055,023 | A | 4/2000 | Rumreich et al. |
| 6,097,441 | A | 8/2000 | Allport |
| 6,104,334 | A | 8/2000 | Allport |
| 6,141,654 | A | 10/2000 | Heiden et al. |
| 6,154,733 | A | 11/2000 | Pierce et al. |
| 6,173,274 | B1 | 1/2001 | Ryan, Jr. |
| 6,215,528 | B1 | 4/2001 | Lin et al. |
| 6,263,507 | B1 | 7/2001 | Ahmad et al. |
| 6,415,438 | B1 | 7/2002 | Blackketter et al. |
| 6,530,082 | B1 | 3/2003 | Del Sesto et al. |
| 6,535,880 | B1 | 3/2003 | Musgrove et al. |
| 6,665,873 | B1 | 12/2003 | Steenbeek et al. |
| 6,766,524 | B1 * | 7/2004 | Matheny et al. ................. 725/23 |
| 6,768,722 | B1 | 7/2004 | Katseff et al. |
| RE38,600 | E | 9/2004 | Mankovitz |
| 6,831,952 | B2 | 12/2004 | Francis et al. |
| 6,976,003 | B1 | 12/2005 | Hamor et al. |
| 7,003,792 | B1 | 2/2006 | Yuen |
| 7,126,714 | B1 | 10/2006 | Inui |
| 7,244,180 | B2 | 7/2007 | McHugh |
| 7,296,282 | B1 | 11/2007 | Koplar et al. |
| 7,373,247 | B2 | 5/2008 | Park |
| 7,409,700 | B1 | 8/2008 | Watson |
| 7,446,816 | B2 | 11/2008 | Tomita et al. |
| 7,603,430 | B1 | 10/2009 | Artz, Jr. et al. |
| 7,966,634 | B2 | 6/2011 | Hoppe et al. |
| 7,979,877 | B2 | 7/2011 | Huber et al. |
| 2001/0039515 | A1 | 11/2001 | Mayadas |
| 2001/0055391 | A1 | 12/2001 | Jacobs |
| 2002/0016776 | A1 | 2/2002 | Chu et al. |
| 2002/0023263 | A1 | 2/2002 | Ahn et al. |
| 2002/0042920 | A1 | 4/2002 | Thomas et al. |
| 2002/0044763 | A1 | 4/2002 | Wehmeyer et al. |
| 2002/0078171 | A1 | 6/2002 | Schneider |
| 2002/0083441 | A1 | 6/2002 | Flickinger et al. |
| 2002/0120925 | A1 | 8/2002 | Logan |
| 2002/0152091 | A1 | 10/2002 | Nagaoka et al. |
| 2002/0188959 | A1 * | 12/2002 | Piotrowski ................. 725/112 |
| 2003/0005084 | A1 * | 1/2003 | Humphrey ................. 709/218 |
| 2003/0046570 | A1 | 3/2003 | Ronkka et al. |
| 2003/0066069 | A1 * | 4/2003 | Mankovich ................. 725/9 |
| 2003/0078863 | A1 | 4/2003 | Pilu |
| 2003/0083932 | A1 | 5/2003 | Wolf et al. |
| 2003/0105666 | A1 | 6/2003 | Taub et al. |
| 2003/0159153 | A1 | 8/2003 | Falvo et al. |
| 2004/0117857 | A1 | 6/2004 | Bisdikian et al. |
| 2005/0060337 | A1 | 3/2005 | Chou et al. |
| 2005/0100113 | A1 | 5/2005 | Corts et al. |
| 2005/0130585 | A1 | 6/2005 | Gnuschke et al. |
| 2005/0155062 | A1 | 7/2005 | Hiltunen |
| 2005/0278747 | A1 | 12/2005 | Barton et al. |
| 2006/0028689 | A1 | 2/2006 | Perry et al. |
| 2006/0123449 | A1 | 6/2006 | Ma et al. |
| 2006/0184994 | A1 | 8/2006 | Eyer et al. |
| 2007/0162434 | A1 * | 7/2007 | Alessi et al. ................. 707/4 |

FOREIGN PATENT DOCUMENTS

| | | |
|---|---|---|
| GB | 2 346 472 | 8/2000 |
| WO | 1999/35771 | 7/1999 |
| WO | 99/67904 | 12/1999 |
| WO | 2002/102079 | 12/2002 |
| WO | 03/034735 | 4/2003 |
| WO | 03/095945 | 11/2003 |
| WO | 2004/019441 | 3/2004 |

OTHER PUBLICATIONS

AGB Italia, "The System>Data transmission" webpage, 2003.
International Application No. PCT/IN2005/000124, International Preliminary Report on Patentability mailed on Apr. 3, 2007, 7 pages.
International Application No. PCT/IN2005/000124, International Search Report and Written Opinion mailed on Aug. 31, 2005, 11 pages.
International Application No. PCT/IN2005/000269, International Preliminary Report on Patentability mailed on Apr. 3, 2007, 6 pages.
International Application No. PCT/IN2005/000269, International Search Report and Written Opinion mailed on Oct. 28, 2005, 7 pages.
International Application No. PCT/IN2005/000302, International Preliminary Report on Patentability mailed on Apr. 3, 2007, 8 pages.
International Application No. PCT/IN2005/000302, International Search Report and Written Opinion mailed on Jan. 5, 2006, 10 pages.
International Application No. PCT/IN2005/000313, International Preliminary Report on Patentability mailed on Apr. 3, 2007, 7 pages.
International Application No. PCT/IN2005/000313, International Search Report and Written Opinion mailed on Feb. 9, 2006, 9 pages.
International Application No. PCT/IN2005/000325, International Preliminary Report on Patentability mailed on Oct. 30, 2007, 6 pages.
International Application No. PCT/IN2005/000325, International Search Report and Written Opinion mailed on Feb. 9, 2006, 7 pages.

(56) References Cited

OTHER PUBLICATIONS

International Application No. PCT/IN2005/000344. International Preliminary Report on Patentability mailed on Feb. 12, 2008, 7 pages.
International Application No. PCT/IN2005/000344, International Search Report and Written Opinion mailed on Jun. 2, 2006, 9 pages.
International Application No. PCT/IN2005/000350, International Preliminary Report on Patentability mailed on Oct. 30, 2007, 5 pages.
International Application No. PCT/IN2005/000350, International Search Report and Written Opinion mailed on Mar. 16, 2006, 7 pages.
International Application No. PCT/IN2005/000351, International Preliminary Report on Patentability mailed on Oct. 30, 2007, 5 pages.
International Application No. PCT/IN2005/000351, International Search Report and Written Opinion mailed on Mar. 1, 2006, 7 pages.
U.S. Appl. No. 10/954,816. Final Office Action mailed on May 1, 2009, 14 pages.
U.S Appl. No. 10/954816, Non-Final Office Action mailed on Oct. 3, 2008, 11 pages.
U.S. Appl. No. 10/954,816, Notice of Allowance mailed on Jun. 10, 2013, 9 pages.
U.S. Appl. No. 10/955,013, Final Office Action mailed on Aug. 21, 2008, 23 pages.
U.S. Appl. No. 10/955,013, Final Office Action mailed on Aug. 5, 2009, 13 pages.
U.S. Appl. No. 10/955,013, Non-Final Office Action mailed on Jan. 26, 2009, 1 page.
U S. Appl. No, 10/955,013, Non-Final Office Action mailed on Jan. 9, 2009, 25 pages.
U.S. Appl. No. 10/955,013, Non-Final Office Action mailed on Mar. 6, 2008, 22 pages.
U.S. Appl. No. 11/572,818, Final Office Action mailed on Feb. 4, 2011, 19 pages.
U.S Appl. No. 11/572,818, Final Office Action mailed on Jan. 4, 2012, 15 pages.
U.S. Appl. No. 11/572,818, Final Office Action mailed on Mar. 31, 2010, 18 pages.
U.S. Appl. No. 11/572,818, Non-Final Office Action mailed on Aug. 22, 2011, 19 pages.
U.S. Appl. No. 11/572,818, Non-Final Office Action mailed on Aug. 22, 21312, 12 pages.
U.S. Appl. No. 11/572,818, Non-Final Office Action mailed on Jul. 22, 2010, 18 pages.
U.S. Appl. No. 11/572,818, Non-Final Office Action mailed on Jun. 29, 2009, 15 pages.
U.S. Appl. No. 11/572,818, Non-Final Office Action mailed on Mar. 28, 2013, 13 pages.
U.S. Appl. No. 11/572,818, Notice of Allowance mailed on Oct. 15, 2013, 10 pages.
U.S. Appl. No, 11/692,209, Non-Final Office Action mailed on Jun. 10, 2010, 26 pages.
U.S. Appl. No. 11/692,209, Non-Final Office Action mailed on May 13, 2009, 19 pages.
U.S. Appl. No. 11/692,209, Non-Final Office Action mailed on Sep. 19, 2012, 26 pages.
U.S. Appl. No. 11/918,087, Final Office Action mailed on May 20, 2011, 4 pages.
U.S. Appl. No. 11/918,087, Non-Final Office Action mailed on Dec. 13, 2010, 13 pages.
U.S. Appl. No. 11/918,087, Non-Final Office Action mailed on Jun. 10, 2010, 12 pages.
U.S. Appl. No. 11/997,904, Non-Final Office Action mailed on Apr. 7, 2011, 11 pages.
U.S. Appl. No. 11/997,904, Non-Final Office Action mailed on Nov. 12, 2010, 10 pages.
U.S. Appl. No. 11/997,904, Notice of Allowance mailed on Sep. 9, 2011, 5 pages.

* cited by examiner

SYSTEMS AND METHODS FOR MEASURING INTEREST LEVELS OF AUDIENCE IN BROADCAST PROGRAM AND PROVIDING INFORMATION BASED ON THE INTEREST LEVELS

The present patent application claims priority under 35 USC 371 to the PCT patent application of PCT/IN2005/000350, which has a filing date of Oct. 31, 2005.

FIELD OF INVENTION

The present invention relates to systems and methods for providing broadcast program information to audience. More specifically, it relates to systems and methods for measuring interest levels of audience in a broadcast program and providing information based on the interest levels.

BACKGROUND

In media broadcasts, there is always a desire to obtain information on the participation of audience as accurately and at low cost as possible. A well known method is the use of a Peoplemeter device for monitoring the viewing behavior of television audience. However, typical limitations of this approach include requiring active audience intervention and participation to record the viewing information and data recorded is not used for providing follow-up or extra services (i.e. information) to the audience.

Therefore, it is desirous to provide alternative methods and systems for measuring the interest levels of audience in a broadcast program and providing information based on the interest levels.

BRIEF DESCRIPTION OF THE DRAWINGS

Embodiments of the present invention are herein described, purely by way of example, with reference to the accompanying drawings, in which.

DETAILED DESCRIPTION

Figure 1A:
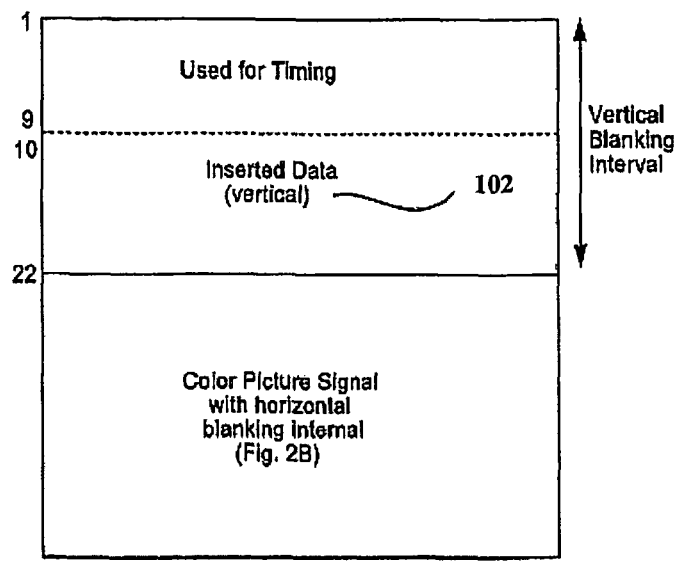
FIG. 1A illustrates the location of a vertical blanking interval in a conventional broadcast television signal employed in an embodiment of the present invention.

Methods and systems for measuring interest levels of audience in a broadcast program and providing information based on the interest level are described hereinafter with references to FIGS. 1-6. For clarity and convenience, the following definitions are used herein:

The term "data-augmented AV signal" refers to an AV signal of a television program content or an audio signal of a radio program content (hereinafter generally referred to as AV signal) which has "supplementary content" added to the AV signal. The data-augmented AV signal has the format of the original television or radio AV signal. Typically, the supplementary content is inserted into "a non-program portion" of the AV signal while the program content is carried in a program portion of the AV signal.

The term "supplementary content" refers to information or data relating to the program content of the AV signal of a television or radio broadcast program. The information or data can be, for example, mobile phone ring-tones, music, games, pictures, video clips, sound bites, general information, and the like audience desired information all of which are associated with or in connection to the program content. The supplementary content is able to be printed on a printer, reproduced or rendered on an electronic device, or stored in a data storage device, in an embodiment, substantially concurrently with the rendering of the program content.

The description "non-program portion" refers to the portion of the AV signal which is reserved for conveying information or data other than the program content. Exemplary embodiments of the non-program portion of the AV signal include the vertical blanking interval (VBI) of an analog television signal or an equivalent signal portion of digital television broadcast signal (referred to as DVB-VBI and DVB-TXT in the Digital Video Broadcast (DVB) Standard), as well as equivalents in digital radio broadcasting (e.g. the programming associated data channel in a digital audio broadcast signal).

The term "conventional broadcast receiver" refers to radio and television receivers or sets which are primarily dedicated to the function of receiving radio and television broadcasts, respectively. A conventional broadcast receiver typically has a demodulation circuit operable to extract program content from the data-augmented AV signal which has the same format as the conventional AV signal.

"Conventional radio receivers" within this definition include digital audio radios as described below. Other digital and analog receivers operable to extract program content from a radio broadcast signal may be employed in alternative embodiments. As used herein, the term "conventional television set" refers to conventional analog television sets, such as those configured to process television broadcast signals transmitted in NTSC format, using, for example, North American Basic Teletext (NABTS), PAL and SECAM broadcast formats, using, for example, the European Broadcast Union (EBU) Teletext Standards. In a further embodiment, the term "conventional television set" includes digital televisions receivers, such as those operable to process HDTV broadcasts using, for example, the Vertical Ancillary Data (VANC), and the like standards. Notwithstanding specific references made herein, the term "conventional television set" extends to television sets primarily operable to receive and process broadcast signals, regardless of when it is developed, which employ a non-program portion of the AV signal onto which the supplementary content can be inserted. Specifically excluded from "conventional broadcast receivers" are systems, such as computers, which can be programmed or otherwise modified to emulate the functionality of a commonly known television or radio receiver. Such systems do not have as its primary function to receive and process such broadcast signals, and are not specifically dedicated to operate as broadcast receivers, and accordingly are not within the scope of the present disclosure.

The term "conventional" as used with regard to broadcast, radio, or television receivers/sets refers to the primary functionality of the broadcast receiving system as described, and does not refer to the timing of when such a broadcast system was developed or deployed, which may be at any time during the past, present or future.

Television Data-Augmented AV Signal

As known in the art of analog television broadcasting, program content of a television program is provided in the form of an AV signal which includes a program portion and non-program portion in each frame. The program portion is used for carrying program content while the non-program portion is used for carrying extra information or data such as the vertical and horizontal traces information. In the television broadcast standard, the non-program portion of the AV signal is typically the vertical blanking interval (VBI) found in each frame of the AV signal.

More recently, a variety of digital video broadcast (DVB) standards are also used for broadcasting programs via satellite (DVB-S), cable (DVB-C), terrestrial (DVB-T), or via handheld and mobile terminals (DVB-H). Similar to the VBI in the analog AV signals, DVB broadcast signals also allow the simulcasting of supplementary content or data through DVB-TXT or DVB-VBI. When a digital broadcasting system is employed, the DVB-TXT/VBI is used to deliver the supplementary content as described in the foregoing. For convenience, the description "vertical blanking interval" refers to the vertical blanking interval (VBI) of the analog broadcast television signal, as well as the equivalent non-program portion of the digital broadcast television signals.

FIG. 1A illustrates the location of a VBI in a conventional television broadcast signal employed in the embodiments. A standard television signal consists of 625 horizontal lines (575 in North America) which are divided into two frames of 312.5 lines each. The VBI makes up the first 21 lines of each frame. Lines 1 to 9 are typically used for timing setup and lines 10 to 21 are available for carrying data 102.

Each VBI line is capable of transmitting 288 bits per television frame (one packet). At 50 frames per second, 12 VBI lines per frame translate into a raw data rate transmission of about 144 Kbits per second. However, ensuring data integrity requires forward error correction and this reduces the throughput to about 70 Kbits per second. This throughput is better than those provided by asynchronous telephone lines which have a throughput of 19.2 Kbits per second. The error rate after error correction is 1.0e-5 and this compares favorably with telephone network based data transmission technologies.

Figure 1B:
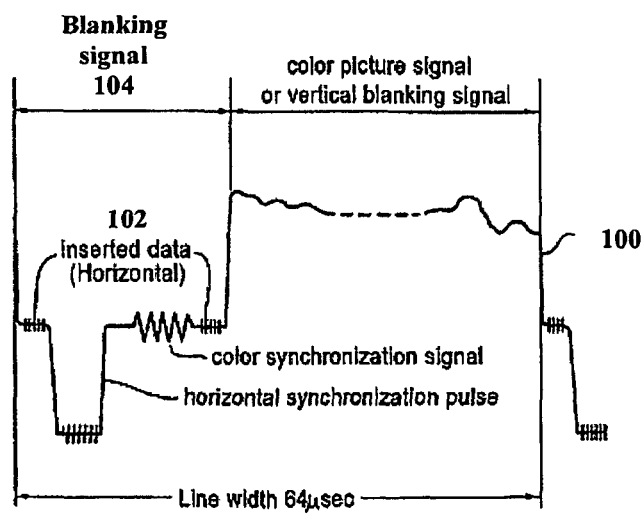
FIG. 1B illustrates the location of a horizontal blanking interval in a conventional broadcast television signal employable in an embodiment of the present invention.

FIG. 1B illustrates the location of a horizontal blanking interval (HBI) in an analog television AV signal 100 which may also be employed in the embodiments instead of the VBI. Data 102 which is inserted into the horizontal blanking portion 104 is not displayed on the television screen along with the program content, as the television tuner is operable to process only the program content embedded in the other portions of the television AV signal 100. Accordingly, references made to VBI herein also extend to HBI.

In a teletext system, a separate channel of information is formed by inserting various types of information, such as news, sports, advertisements, and so on, in the VBI of the television AV signal 100. Typically, the various types of information do not have any correlation with the particular program content of the television AV signal 100. In an embodiment, the VBI is utilized to transport supplementary content specific to the program content of the particular television AV signal 100. In a further embodiment, the supplementary content inserted in a particular VBI represents a supplementary content associating with the program content embedded in adjacent program portion of the AV signal. In this way, each program segment may have a different supplementary content associated therewith and the supplementary content can be accessed substantially concurrently with the rendering of the program content segment at the conventional television set.

Figure 2A:
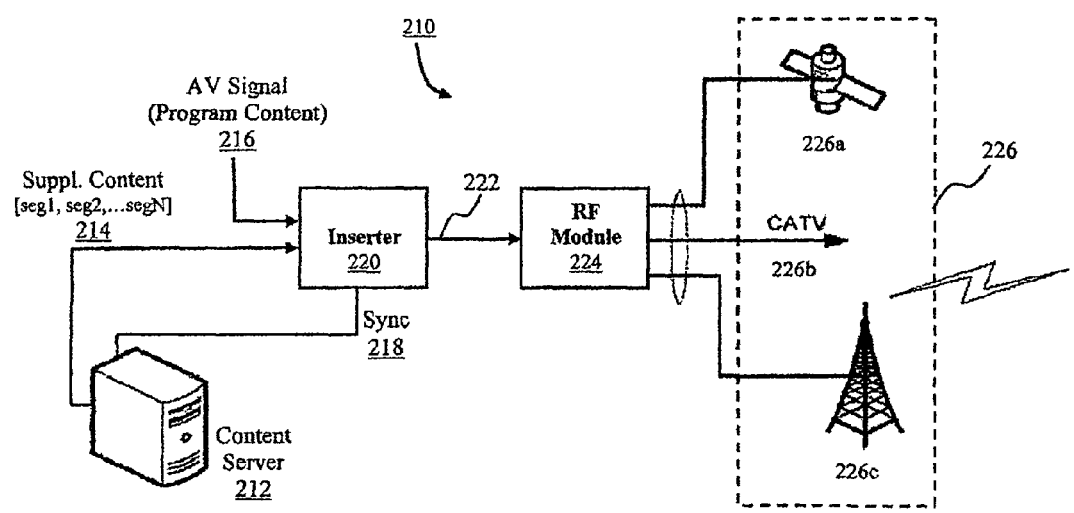
FIG. 2A illustrates a system for providing a data-augmented AV signal in accordance with an embodiment of the present invention.
Figure 2B:
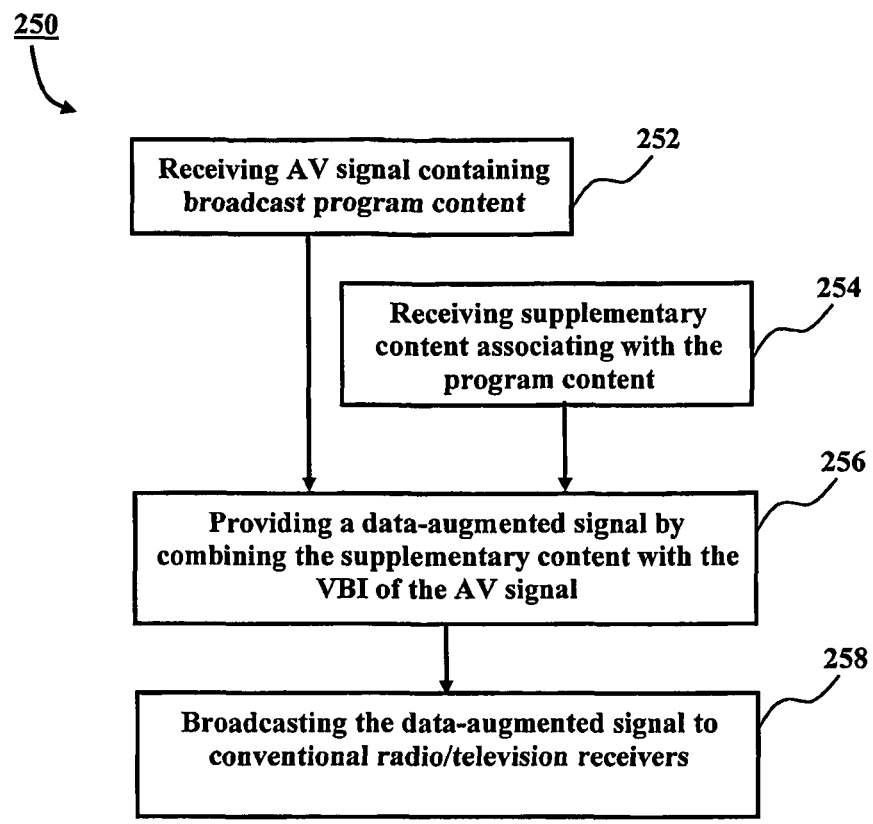
FIG. 2B illustrates a method of providing a data-augmented AV signal in accordance with an embodiment of the present invention.

An embodiment of a system 210 and corresponding method 250 for providing data-augmented AV signals are respectively illustrated in FIGS. 2A and 2B. Referring first to the system 210 illustrated in FIG. 2A, the system 210 includes a content server 212, an inserter 220, an RF module 224, and a transmitter 226, which may include a satellite transmitter 226a, a cable television transmitter 226b, or a transmitting tower 226c. These transmitting means are only exemplary, and other transmitter embodiments will be apparent to those skilled in the art.

The content server 212 is operable to provide supplementary content 214 which is associated solely with a program content conveyed in an AV signal 216 provided to the inserter 220. The supplementary content 214 may further include information concerning the program content, such as additional facts, figures or other data, contact information such as a telephone number, physical or email addresses, and the like information which is specific to the program content of the a particular broadcast program. Further, identifying information such as the version number, size, copyright/digital-right status, author and language of the supplementary content file may be included. Additionally, program-specific advertiser or sponsor information may be included in the supplementary content 214. For example, information such as a list of manufacturers who provide cooking equipment shown in a cooking program.

In another embodiment, the supplementary content 214 may include interactive information which is designed to create an interactive session with the television viewers. Such information may include viewer queries which poses questions regarding the content of the broadcast program, and which invites a response thereto. Those skilled in the art will appreciate that other types of supplementary content may be included.

The supplementary content 214 may be parsed into two or more segments with each segment corresponding to a different segment of the program content as conveyed in the AV signal 216. For example, a cooking show may describe the processes of preparing several different dishes. The supplementary content 214 may accordingly include different content segments which include details regarding recipes, recommended cooking times, and so on for the different dishes. The content segments are accordingly sequenced so that the supplementary content conveyed therein is synchronized with the corresponding segments of the program content received by the inserter 220. This process may be facilitated by the use of a synchronization signal 218 communicating between the content server 212 and the inserter 220.

In an embodiment, the supplementary content 214 is organized into a structured file or document, such as an extensible markup language (XML) document. As such, the supplementary content 214 may includes meta-data which is tagged using known or broadcast industry adopted tags and fields. For example, identification of an advertiser or sponsor associated with one or more segments of the supplementary content may be identified using a meta-data tag "Sponsor ID". Other meta-data tags corresponding to additional information may also be used. For example, meta-data tag "Lang ID" may be used to identify the language of the supplementary content, "Date ID" to identify the composition date of the supplementary content, "DRM ID" to identify digital rights management information, "Exp ID" to identify an expiration date of the supplementary content, and "Enc ID" to identify encryption information applied to the supplementary content. The aforesaid tags represent only a small sample of the possible meta-data tags and types of information which can be conveyed, and other meta-data tags may be used alternatively to or in addition thereto in other embodiments.

Furthermore, the structured document may be linked (i.e., associated) with the program, either as one complete document which contains one or more segments of the supplementary content, or as a document having only a single segment of the supplementary content. In the latter case, two or more such documents are used to compose the entire stream of supplementary content 214 with each document is linked to a corresponding segment of the program content. The supplementary content 214, in this exemplary embodiment, includes both the supplementary content associating with the program content and identifying information (e.g., "Sponsor ID") in XML meta-data file.

The following is an example of a structured document having a file extension ".pcm":

```
<?XML V = "1.0"?>
<ContentType>
<DocumentTitle>Test3</DocumentTitle>
<DocumentSize>221</DocumentSize>
<Akey>0001</Akey>
<Document>
<language>en-us</language>
<PageId>1</PageId>
<PageSize>221</PageSize>
<Description>
<![CDATA[_%-12345X@PJL ENTER LANGUAGE=MIME
Content-Type: application/vnd.pwg-multiplexed;
type=application/vnd.pwg-xhtml-print+xml
CHK 1 379 LAST
Content-Type: application/vnd.pwg-xhtml-print+xml
Content-Location: test2.htm
<?xml version="1.0" encoding="UTF-8"?>
<!DOCTYPE html PUBLIC "-//PWG//DTD XHTML-Print
1.0//EN"
"http://www.xhtml-print.org/xhtml-print/xhtml-
print10.dtd">
<html xmlns="http://www.w3.org/1999/xhtml" >
<head>
<title>test</title>
</head>
<body>
abcdefghijklmnopqrstuvwxyz
</body>
</html>
CHK 0 0 LAST
_%-12345X]]>
</Description>
</Document>
```

This structured document (pcm file) is inserted into the VBI lines by the inserter 220. The pcm file consists of two portions, a meta-data portion and a data portion of the supplementary content. In this exemplary pcm file, the data portion is enclosed by the begin tag "<![CDATA" and end tag "]]>" with the rest being the meta-data portion as further described herein.

Tag 1: <?XML V="1.0"?>, and
Tag 2: <ContentType>

These two tags form the mandatory beginning of the pcm file. Tag 1 is used to indicate the beginning of the pcm file. Tag 2 indicates the type of content being conveyed, for example, a text message, a sound bite, a video clip, or a combination thereof.

Tag 3: <DocumentTitle>Test3</DocumentTitle>

Every pcm file has a unique document title. The value of tag 3 is used to distinguish one document from another during broadcasting.

Tag 4: <Documentsize>221</DocumentSize>

The value of tag 4 indicates the size of the data portion in bytes in hexadecimal. This is not the size of the pcm file. In this example, the data portion is printable and is presented in ASCII text. It is also possible to use other formats such as postscript, pdf, and the like document formats. The data portion can also be in the form of binary data and non-printables.

Tag 5: <Akey>0001</Akey>

"Akey", in this example, refers to access key. The supplementary content processor (such as the one shown in FIGS. 3A and 4) decodes pcm file only when the value of tag 5 is a known or recognized value. Thus, for pcm files that are meant for general access by the public, the "Akey" value would be one which is assigned as such, for example, "0001" as in this example.

Tag 6: <Document>
Tag 7: <language>en-us</language>

Tag 6 indicates the beginning of the details of the data portion. Tag 7 indicates the language of the data portion (printable in this example). This information is displayable on the screen of the television or the display of the supplementary content processor.

Tag 8: <PageId>1</PageId>
Tag 9: <PageSize>221</PageSize>

The value of tag 8 indicates the page number. The value of tag 9 indicates the size of the data portion of the page in consideration. In this example, the size of the document and the page is the same as there is only one page. In multiple page documents, the size of the page would be smaller than the size of the document.

Tag 10: <Description>, Tag 11: </Description>, and Tag 12: </Document>

Tags 10 and 11 enclose the data portion. Tag 12 indicates the end of the document details.

Referring back to FIG. 2A, the inserter 220 adds application level forward error correction (FEC) to the supplementary content 214 and thereafter embeds the treated supplementary content 214 in the non-program portion (i.e. VBI in the case of a television AV signal) of the AV signal 216. The output from the inserter 220 is a data-augmented AV signal 222 which is fed to the RF module 224. The RF module 224 channel codes the data-augmented AV signal 222 before converting it to an intermediate frequency and finally to an RF broadcast signal for broadcasting. The RF broadcast signal is broadcast using the transmitter 226 via one of the transmitting means described in the foregoing.

In DVB standards, the data-augmented AV signal 222 is broadcast in MPEG2 and the like digital formats. Thus, an encoder (not shown) is provided to converted the data-augmented AV signal 222 output from the inserter 220 into an MPEG2 stream before feeding the MPEG2 stream to the RF module 224 for further signal conditioning.

Referring to FIG. 2B in which the corresponding method 250 of providing the data-augmented AV signal is illustrated. Initially at step 252, the inserter 220 receives streams of AV signal (containing a program content) 216 of a broadcast program. In one embodiment, the program content typically includes ready produced audio/video of the broadcast program and is provided along with supplementary content identifying information, sponsor/advertiser information, or other program related contents. In another embodiment, however, such as live televised sports programs, the program content is produced in real-time. Thus, the corresponding supplementary content 214 (for example, the batting average of a currently displayed baseball player at-bat which may be prepared beforehand and stored in the content server 212), is supplied to the inserter 220 synchronously with the live program content.

In step 254, the inserter 220 receives the supplementary content 214 associating with the program content from the content server 212. Subsequently in step 256 (also referring to FIG. 2A), the supplementary content 214 is combined with or inserted into the VBI of the AV signal 216 to provide the data-augmented AV signal 222. Additional processes may be used to complement the combining processes at the inserter 220. For example, a forward error correcting algorithm may be applied to the supplementary content 214 to improve transmission reliability. It would be apparent that other coding algorithms may be used in alternative embodiments.

In an embodiment, the provision of the supplementary content 214 can be synchronized with the appropriate program content segment using the synchronization signal 218. Thus, the combining process involves synchronizing segments of the supplementary content 214 with the vertical blanking intervals of the AV signal 216 portions which carry the corresponding segments of the program content.

The data-augmented AV signal 222 retains the signal waveform of the original television AV signal 216 and can therefore be processed by a television set in the conventional manner. In step 258 (also referring to FIG. 2A), the data-augmented AV signal 222 is provided to the RF module 224 for channel coding and modulation with a carrier signal to provide an RF broadcast signal. Subsequently, the RF broadcast signal is broadcast to receivers using the transmitter 226.

Figure 3A:
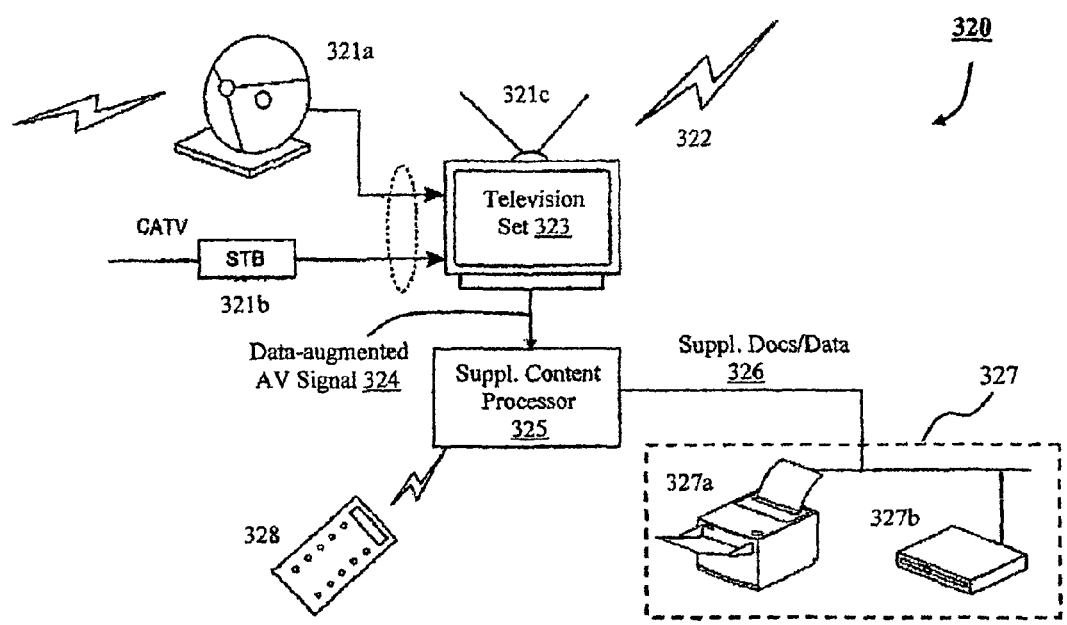
FIG. 3A illustrates a system for processing a data-augmented AV signal in accordance with an embodiment of the present invention.
Figure 3B:
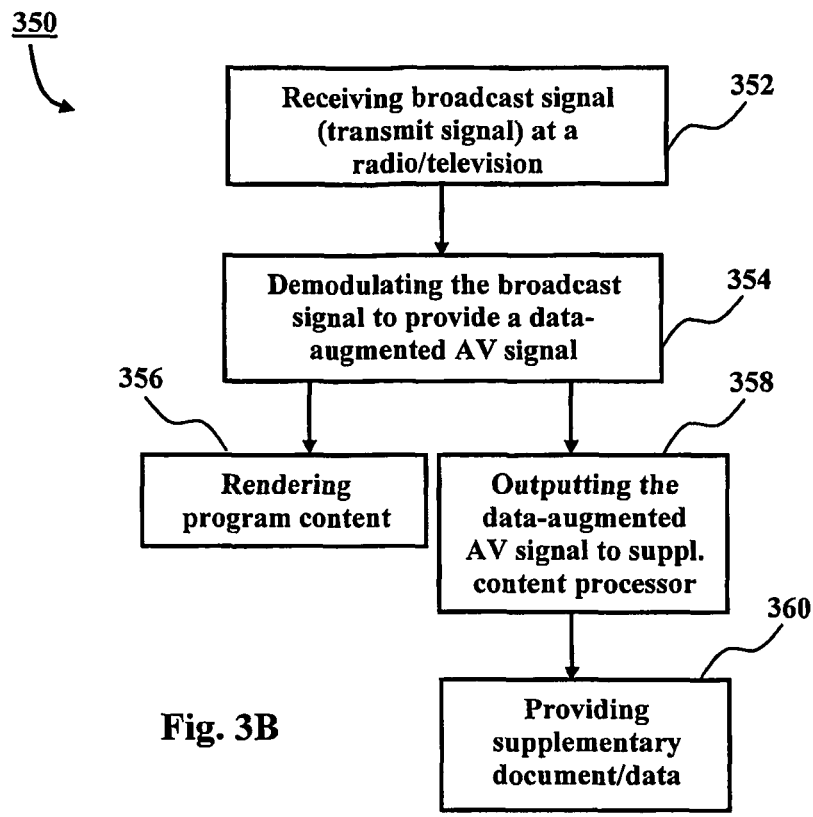
FIG. 3B illustrates a method of processing a data-augmented AV signal in accordance with an embodiment of the present invention.

An embodiment of a system 320 and corresponding method 350 for processing data-augmented AV signals are respectively illustrated in FIGS. 3A and 3B. Referring first to the system 320 illustrated in FIG. 3A, the system 320 includes a receiving means 321 (a, b, c), a conventional television set 323, a supplementary content processor 325, a content output means 327 (a, b), and an optional a remote controller unit 328. Exemplary receiving means includes a satellite receiver 321a, a set top box 321b, and a television aerial 321c, each of which is adapted to receive RF broadcast signal 322 which can be processed by the convention television set 323 in the conventional manner. The television set 323 has electronic circuits to perform the reverse processes that take place at the broadcasting end. The television set 323 demodulates the RF broadcast signal 322 to provide a data-augmented AV signal (i.e. base-band signal) 324 which contains the program content and the supplementary content.

The conventional television set 323 then renders the program content on the television screen in the conventional manner. At the same time, the data-augmented AV signal 324 is output to the supplementary content processor 325, for example, via a video output port of the conventional television set 323, where the supplementary content is extracted therefrom.

The supplementary content processor 325 (hereinafter also referred to as Supplementary Decoder) further processes the extracted supplementary content to provide supplementary documents or data 326 which are associated with the program content being rendered on the conventional television set 323. Subsequently, the supplementary data 326 can be output to a printer 327a for hardcopy printout or can be stored in a data storage device 327b. The output device 327 can also include other electronic devices such as mobile phones, PCs, and PDAs.

In an embodiment, the remote controller unit 328 (the functionality of which may be incorporated into a remote controller unit of the conventional television set 323) can be used to control the supplementary data downloading process at the supplementary content processor 325. In an embodiment, the remote controller unit 328 is operable to instruct the supplementary content processor 325 to process the data-augmented AV signal 324 whereby the supplementary content 324 corresponding to the currently viewed program content is extracted and assembled to provide the supplementary documents or data 326 which are subsequently delivered to one or more of the output devices 327. In this manner, the viewer can download supplementary content concurrently with little or no disruption to the program viewing experience.

A method 350 of processing a data-augmented AV signal using the system 320 of FIG. 3A is shown in FIG. 3B. Initially at step 352, the RF broadcast signal 322 is received (or recovered by the receiving means 321). The RF broadcast signal 322 is in the format of an original television broadcast signal and thus, can be processed by the conventional television set 323 in the conventional manner. The RF broadcast signal 322 contains the data-augmented AV signal. In step 354, a demodulating circuit (not shown) of the television set 323 is used to demodulate the RF broadcast signal 322 (in the conventional manner) to provide a base-band signal (i.e. the data-augmented AV signal 324) which contains the program content and the supplementary content. The program content is subsequently rendered on the television screen in the conventional manner in step 356. At substantially the same time, the data-augmented AV signal 324 can be output to the supplementary content processor 325 for extracting and processing the supplementary content in step 358.

The supplementary content processor 325 is operable to extract the supplementary content from the data-augmented AV signal and assembles the supplementary content into one or more printable supplement documents or data 326. Further details of the supplementary content processor 325 are described below with reference to FIG. 4. The supplementary documents or data 326 are delivered to output devices 327, which in two exemplary embodiments include a printer 327a and a data storage device 327b in step 360. It should be noted that other output devices may be used alternatively or in addition thereto. Connection between the supplementary content processor 325 and the output devices 327 may be realized through various connection means, such as USB, IEE1394, SCSI, parallel connections, wireless connections (e.g. Bluetooth, WiFi), and the like communication means.

Radio Data-Augmented Signal

The system 210 and method 250 of FIGS. 2A and 2B can also be used to provide and process radio signals augmented with data. As an example, a digital audio broadcasting (DAB) system employs a non-program audio signal component, commonly known as a program associated data (PAD) channel, which can be used as the vehicle for transporting the supplementary content. In such an embodiment, the system 210 and corresponding method 250 can be used in substantially the same manner, as described in the foregoing, for receiving and processing a DAB broadcast signal of a DAB program and supplementary content associating with the DAB program. The supplementary content is provided by the content server 212. The inserter 220 which is adapted for processing the DAB broadcast signals is used to insert the supplementary content into the PAD channel of the DAB signal, thereby forming a (DAB) radio data-augmented signal. The radio data-augmented signal is subsequently converted to a radio broadcast signal for broadcasting via transmitting means, exemplary embodiments include satellite, cable, and tower transmitters. The specific modulation process is a known art and is governed by the DAB broadcasting standards.

Figure 3C:
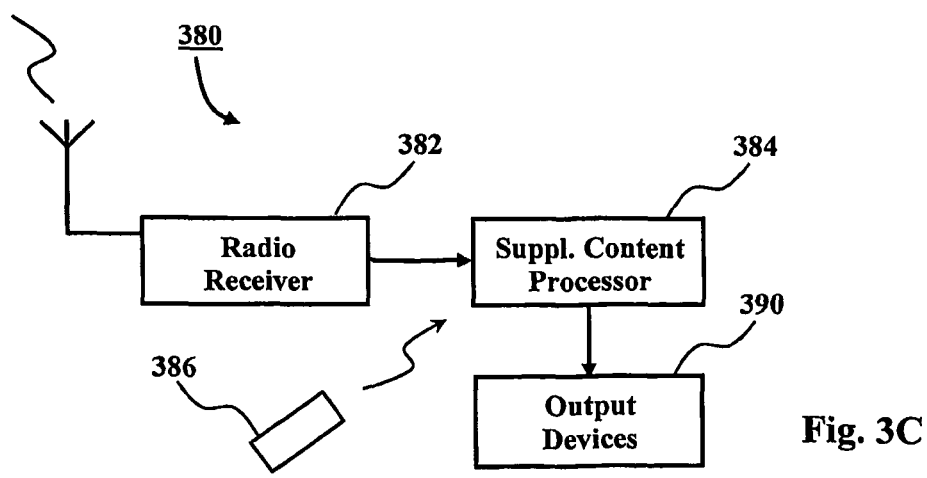
FIG. 3C illustrates a radio system for processing a radio data-augmented signal in accordance with an embodiment of the present invention.

Likewise, similar system and method to those of FIGS. 3A and 3B may be used for receiving and processing the radio data-augmented signal. In an exemplary embodiment, a radio system 380 for receiving and processing the radio broadcast signal of the aforementioned DAB is shown in FIG. 3C. The radio system 380 includes a conventional radio receiver 382 for receiving the radio broadcast signal. Additionally, the conventional radio receiver 382 includes a demodulator or other such circuitries operable to demodulate the radio broadcast signal to provide a radio base-band signal (i.e. the radio data-augmented signal) containing the DAB program and supplementary content. The radio system 380 further includes a supplementary content processor 384 for receiving the base-band signal and extracting the supplementary content therefrom. The supplementary content is then assembled to provide one or more supplement documents or data, which, for instance, by using a remote controller unit 386, can be delivered to an output device 390. The output device 390 can be a printer, data storage device, PDA, PC, and the like electronic devices.

Figure 4:
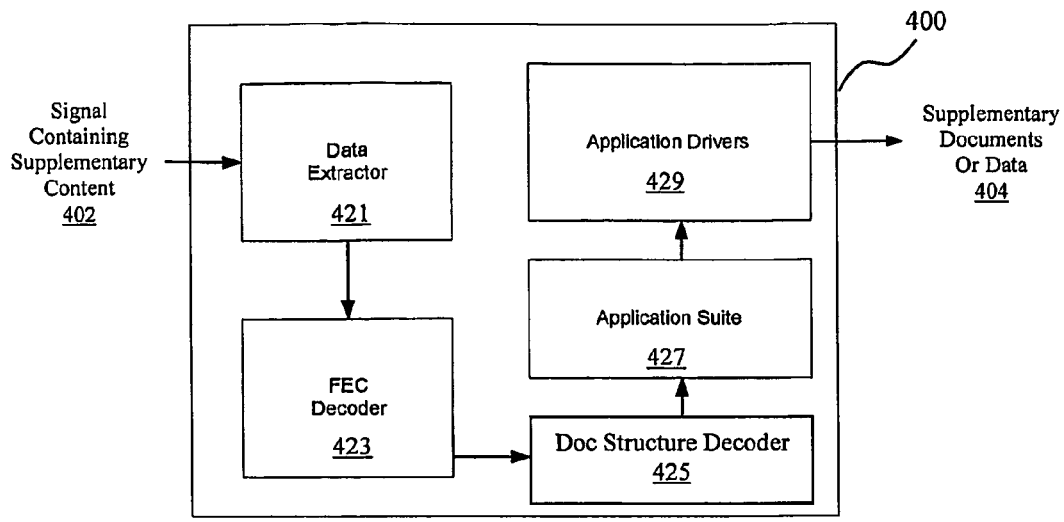
FIG. 4 illustrates a functional block diagram of a supplementary content processor shown in FIG. 3A in accordance with an embodiment of the present invention.

FIG. 4 illustrates a functional block diagram of a supplementary content processor 400 (such as the supplementary content processor 325 shown in FIG. 3A) that includes a data extractor 421, an optional forward error correction (FEC) decoder 423, a document structure decoder 425, an application suite 427, and associated application drivers 429. During operation, streams of base-band signal 402 containing the supplementary content is provided to the supplementary content processor 400. The data extractor 421 extracts embedded supplementary content, for examples applets or programming, from the base-band signal 402. Additional operations within the data extractor 421 may include parsing the supplementary content into segments, if this format is needed or the recovered supplementary content is not so arranged.

Once the supplementary content is extracted from the base-band signal 402, the supplementary content is put through the FEC decoder 423 to correct any errors introduced during broadcasting. The output from the FEC decoder 423 is subsequently fed to the document structure decoder 425.

In an embodiment, the supplementary content (which may include more than one segment, as described above) is recovered in the form of structured data such as XML-formatted data. In such an embodiment, the document structure decoder 425 is employed to decode the meta-data, or other such similar data used in alternative structured document. The decoded data is provided to the application suite 427 which further assembles the decoded data into the desired format (i.e. data 404) for a particular application. The application drivers 429 are operable to interface with a particular output device 327, and may be incorporated within the application suite 427 in an alternative embodiment. The appropriately formatted data 404, referred to in the foregoing FIG. 3A as supplementary documents or data 326, is subsequently provided to one or more of the output devices 327.

The supplementary content processor 400 may further include a remote controller interface module (not shown) to which various command signals can be issued for instructing the supplementary content processor 400 to perform one, some, or all of the aforementioned supplementary content processor functions. As an example, the supplementary content processor 400 continually processes streams of supplementary content segments as described in relation to the content server 212 of FIG. 2A. Each supplementary content segment includes supplementary content corresponding to, and synchronized with, a segment of the program content. When the viewer is presented with a topic that the viewer desires to acquire more information on, the viewer actuates the appropriate buttons on the remote controller unit. The signal produced thereby in turn activates the supplementary content processor 400 to generate the supplementary document or data 404 for output to one or more of the output devices. In this manner, the corresponding content segment can be downloaded (as a printed or stored electronic document, for instance) conveniently with minimal disturbance to the viewing experience.

The systems and methods described in the foregoing can be used for measuring interest levels of audience in a broadcast program and providing information based on the interest levels as described hereinafter with reference to FIGS. 5-6. FIGS. 5A and 5B respectively illustrate a system 510 and method 550 for enabling the measurement of interest levels of broadcast programs by augmenting the broadcast programs with multiple supplementary contents, wherein each supplementary content contains information relating to the broadcast programs.

Figure 5A:
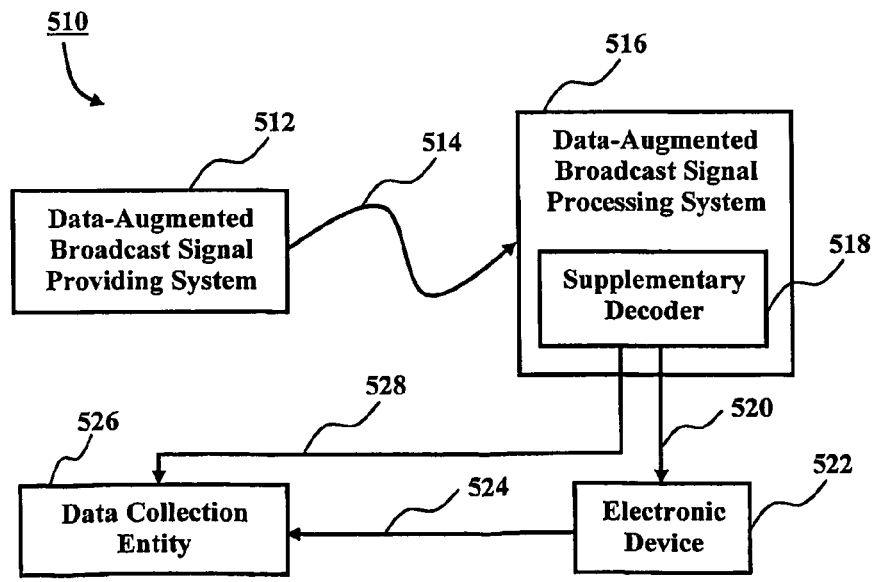
FIG. 5A illustrates a system for measuring an interest level of audience in a broadcast program and providing information based on the interest level in accordance with an embodiment of the present invention.

The system 510 as shown in FIG. 5A according to an embodiment includes a data-augmented broadcast signal providing system 512, a data-augmented broadcast signal processing system 516, and an electronic device 522. In this exemplary embodiment, the data-augmented broadcast signal providing system 512 and the data-augmented broadcast signal processing system 516 are similar in makeup to the respective systems shown in FIGS. 2A and 3A (and 3C) as described in the foregoing. Information or data associating with a broadcast program is provided as supplementary content to the data-augmented broadcast signal providing system 512.

The supplementary content is combined with the broadcast program to provide a data-augmented AV signal which is subsequently modulated with a carrier signal to provide a transmit signal 514 for broadcasting in the conventional manner (i.e. television or radio broadcasting). In an embodiment, two types of supplementary contents may be provided. A first supplementary content includes a program information document. The following is an example of the program information document:

a) Program Name: FRIENDS
b) Program Segment No.: 1 of 6
c) Program Rating: PG
d) Program Duration: 30 mins The program information document includes a) the program name (i.e. a tag identifying the broadcast program); b) the program segment number which is used for monitoring the program viewing progress; c) the program rating; and d) the duration of the program. The program information document is provided and combined with the broadcast program at a pre-determined interval, for example, every five minutes. Thus, for a television program of 30 minutes duration, six program information documents are provided. In this case, each of the six program information documents has a different program segment number with the first program segment number corresponds to the first five minutes (i.e. first segment) of the broadcast program. Similarly, the sixth program segment number corresponds to the last five minutes (i.e. last segment) of the broadcast program. Also referring to FIG. 2A, in an embodiment, the content server 212 provides a program information document every five minutes to the inserter 220 for combining with the broadcast program 216 using the synchronization signal 218 to coordinate the combining timing. In another embodiment, the inserter 220 may trigger the content server 212 to provide the next program information document using the synchronization signal 218.

A second supplementary content includes a program summary document. The following is an example of the program summary document:

a) Program Name: FRIENDS
b) Program Summary
   [1] (Summary of segment 1)
   [2] (Summary of segment 2)
   [3] (Summary of segment 3)
   [4] (Summary of segment 4)
   [5] (Summary of segment 5)
   [6] (Summary of segment 6)

The program summary document includes a) the program name and b) a summary on each of the six broadcast program segments. In an embodiment, the summaries can be in a text form, pictures extracted from the respective broadcast program segments, or a combination thereof. In another embodiment, the summaries can be provided in a narrated audio form as sound bites. The sound bites may be rendered on the electronic device 522. In yet another embodiment, the summaries can be provided as video clips with or without narrations or text messages.

The program summary document can be provided and combined with the broadcast program at a pre-determined interval which can be different from the timing of the provision of the program information document to the inserter 220. If the timing of the program summary document and the program information document is the same, the contents from both documents can be consolidated and provided in one supplementary content. In this case, the content of the program information can be conveyed in the meta-data portion of the supplementary content and the content of the program summary document can be conveyed in the data portion of the supplementary content.

At the receiving end, the transmit signal 514 is received by the data-augmented broadcast signal processing system 516. The data-augmented broadcast signal processing system 516 demodulates the transmit signal 514 to provide a base-band signal (i.e. the data-augmented AV signal) containing the program content and the supplementary content. The program content is rendered and at substantially the same time, the base-band signal is output to a supplementary decoder 518 where the supplementary content is extracted and further processed.

Figure 6:
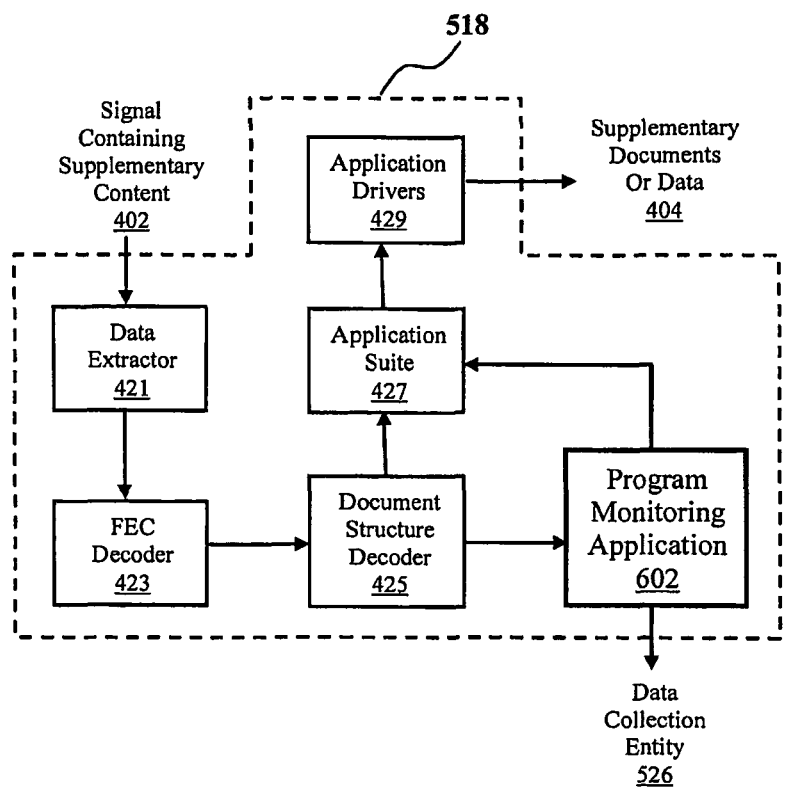
FIG. 6 illustrates a functional block diagram of a supplementary decoder of FIG. 5A in accordance with an embodiment of the present invention.

In this embodiment, the supplementary decoder 518 is similar in makeup to the supplementary content processor 400 (as shown in FIG. 4) and further includes a program monitoring application 602 as shown in FIG. 6. The program monitoring application 602 is coupled to the document structure decoder 425. One of the functions of the program monitoring application 602 is to detect identification tags of broadcast programs. As described in the foregoing, supplementary contents associating with broadcast programs are organized as structured documents, each having a meta-data portion and a data portion. The meta-data portion includes at least one tag for identifying the broadcast program while the data portion includes other information and data relating to the broadcast program.

The program monitoring application 602 scans the meta-data and identifies tags relating to the broadcast programs or other tags which the program monitoring application 602 is programmed to monitor. The identities of the tags are subsequently recorded and stored in a memory (not shown) of the supplementary decoder 518 along with the time the tags are detected. In an embodiment, upon identifying a tag, the program monitoring application 602 checks the meta-data and data portions of the supplementary content to determine what information is available. If the supplementary content contains the program summary document, a copy of the content is stored in the memory of the supplementary decoder 518. However, if a copy already exists, the program monitoring application 602 simply discards any further copies of the program summary document containing the same information.

In an embodiment, the program monitoring application 602 retrieves the program information document from the supplementary content and keeps a record of the program document sequence number according to the program name and the time it is received. The program document sequence number indicates the segment of the broadcast program being viewed. That is, if a program document sequence number is received at the supplementary decoder 518, it means that the program segment corresponding to the program document sequence number is viewed. An example of such a viewing record is shown in a table below:

| Program Name: FRIENDS Channel: A | |
| --- | --- |
| Prog. Sequence No. | Time Received |
| 1 | 8:30 pm |
| 2 | 8:35 pm |
| 5 | 8:50 pm |
| 6 | 8:55 pm |

The above viewing record reflects that the viewer tuned to the first two segments of the broadcast program "FRIENDS". Thereafter, the viewer either turned off the receiver (i.e. the television) or tuned to a different channel. The viewer resumes viewing channel A before or at the beginning of the fifth segment of the broadcast program. In this case, program sequence numbers corresponding to the third and fourth segments are not registered in the viewing record. The program monitoring application 602, upon determining the missing program sequence numbers, alerts the viewer of the availability of a summary on the broadcast program segments not viewed (i.e. segments corresponding to the third and fourth program sequence number). An example of such an alert is:

"Hi, you've missed the viewing period between 8:35 pm to 8:50 pm. Would you like to have a summary of what happened during this period?"

This alert can be presented on the television screen, a display of the supplementary decoder 518, or the electronic device 522. If the viewer desires to obtain the summary (i.e. by pressing a corresponding button on the supplementary decoder 518 or a remote controller unit), the program monitoring application 602 may present the viewers with an option to indicate where the summary should be provided, that is, either on the television screen or sent to the electronic device 522. Upon confirmation, the program monitoring application 602 extracts the relevant summary segment from the program summary document stored in the memory and presents the summary to the viewer as indicated.

In another embodiment, if the viewer just tunes in to a broadcast program and the program monitoring application 602 detects no prior record of the broadcast program (i.e. no program sequence number), an indication to inform the viewer of the same can be presented. Such an indication can be a blinking light at the supplementary decoder 518 or displaying a short message on the television screen to inform the viewer to stay tuned for information on the program being broadcast. An example of such a message can be:

"Welcome, it appears you've just tuned in. Please standby for information on this program."

Once a supplementary content containing the program information document is received, the program monitoring application 602 can provide a subsequent message to the viewer, for example:

"This program started showing at 8:30 pm. Would you like a summary on the missing segment of the program?"

Upon receiving a positive confirmation from the viewer, the summary can be provided straight away if the program summary document is broadcast along with the program information document. However, if the program summary document is broadcast at a different time interval from the program information document, the program monitoring application 602 may inform the viewer of the forth coming summary requested, for example:

"Please standby for the summary requested." or, "The summary requested will be available within 3 minutes."

The above communication messages with the viewer, including the summary, can be provided using the electronic device 522. The electronic device 522 is linked to the supplementary decoder 518 via a communication link 520. The electronic device 522 can be a printer, mobile phone, PDA, PC, and the like utility devices. Accordingly, the communication link 520 can be a wired connection such as USB, Firewire, serial, and parallel connections, or wireless connection such as Bluetooth, WiFi, infra-red, and the like electronic communication means. The electronic device 522 is registered with the supplementary decoder 518 in order to receive the communication messages and summary. However, not all electronic devices registered with the supplementary decoder 518 need to receive the messages. The supplementary decoder 518 can be provided with a user option to select which of the electronic devices registered therewith should receive the messages and only sends the same to the electronic device specified to receive such data. The user option can be presented on a display of the receiver (e.g. television screen) or a display of the supplementary decoder 518.

In the foregoing example, if the summary is in a text form, pictures or a combination thereof, the summary can be rendered in hardcopy if the electronic device 522 is a printer. If the summary is in a text form, pictures, sound bites, video clips, or combinations thereof, the summary can be rendered on the screen of the electronic device 522 if it is a PDA, mobile phone or PC.

In another embodiment, the program monitoring application 602 also measures the interest level of audience in a broadcast program. The program monitoring application 602 does this by checking the program sequence number in the viewing record of the broadcast program as stored in the memory of the supplementary decoder 518. For example, as described in the foregoing, the broadcast program FRIENDS is divided into six segments. However, the program sequence numbers registered in the viewing record are 1, 2, 5, and 6. Taking this as an example, the interest level of the audience in the broadcast program FRIENDS can be computed as follows:

$$\text{Interest Level} = 1 - (\text{Number of Missing Sequence Number}/(\text{Total Number of Sequence Number} - 1)) \quad (1)$$

Thus, the interest level in the broadcast program FRIENDS with two program sequence numbers missing is 0.6 or 60%. It should be noted that other means for calculating the interest level by using the program sequence number can be used. For more accurate measurement, the broadcast program can be divided into more segments which results in increased number of total sequence numbers. Further, each segment may be assigned a weight to indicate the importance. In this case, the program information document can include a weight factor along with the program sequence number.

In another embodiment, special program sequence numbers or heavily weighted program sequence numbers can be sent at specific portions of the program. Such specific portions, for example, can include an initial appearance of a featured or guest actor, introduction of a new item, or a specific product advertisement. Finding these special program sequence numbers registered in the viewing record may indicates an increased interest in the specific portions of the program.

The interest level of equation (1) can be further enhanced by taking into account activities performed by the audience in relation to the broadcast program. For example, in the course of viewing the broadcast program, the audience may download ring-tones, pictures, taglines or favorite phrases, summaries on the missing segments (i.e. segments number 2 and 3), and the like program related content as conveyed in the data-portion of the supplementary content. Thus, the interest level of equation (1) may be modified as follows:

$$\text{Interest Level} = 1 - (\text{Number of Missing Sequence Number}/(\text{Total Number of Sequence Number} - 1)) + ((W_1 * A_1) + W_2 * A_2) + \ldots + W_n * A_n)) \quad (2)$$

where, W is a weight given for an Activity, A. For example, if the audience downloads a ring-tone and a picture to the electronic device 522 anytime during the viewing of the program, and the weight for downloading the ring-tone and picture is 0.1 and 0.05, respectively, then the interest level increases from 60% to 75%.

In an embodiment, the interest level can be computed at the end of the broadcast program, that is, upon receiving the last program sequence number at the supplementary decoder 518. In another embodiment, the interest level can be computed when the audience invokes one of the activities described in the foregoing. Based on the interest level, the program monitoring application 602 can provide with extra information (or services) to the audience. For example, for an interest level of 60% and above, the audience may be prompted with information such as the next broadcast time of the sequel to the broadcast program, programs having the same actors, programs in the same genre, Internet websites or forums relating to the broadcast program, and the like related information. Other information or services can include a specific advertisement, discount vouchers, information on a location shown in the broadcast program, a vacation package deal to the location or special discount offers for items such as computers, watches, clothes, and the like items seen in the broadcast program.

In another embodiment, information relating to specific portions of the program as indicated by the special program sequence numbers registered in the viewing record can be provide regardless of whether the interest level has reached a predetermined level or not. Information provided in the aforementioned embodiments may be provided as supplementary contents (e.g. in the data portion) which are broadcast along with the program and are stored in the memory of the supplementary decoder 518 at the time of the rendering of the broadcast program at a receiver.

In an embodiment, the program monitoring application 602 can be programmed to automatically convey the interest level of the broadcast program to a data collection entity 526. The data collection entity 526 can be the broadcaster of the broadcast program, rating agency, advertiser, research center, and the like entities interested in the viewing behavior of the audience. The interest level can be transmitted to the data collection entity 526 in a number of ways. In an embodiment, the interest level can be sent from the supplementary decoder 518 to the electronic device 522 via the communication link 520. Thereafter, using a communication infrastructure 524 of the electronic device 522, transmitting the interest level to the data collection entity 526 from the electronic device 522. The communication infrastructure 524 is an existing data communication link of the electronic device 522 such as a cellular network, Internet connection, land line, fax line, and the like communication links depending on the type of electronic device 522 in use. Thus, the electronic device 522 and communication link 524 serve as a feedback channel for the mono-direction link between a broadcast station and a conventional receiver. For example, if the electronic device 522 is a mobile phone, the interest level is sent to the data collection entity 526 via the mobile phone cellular network. If the electronic device 522 is a PC, the interest level can be sent to the data collection entity 526 via an Internet connection using email or any other acceptable file transfer protocols. Alternatively, if the electronic device 522 is a printer, the interest level can be printed out using the printer and then fax the printout to the data collection entity 526 using a fax machine connecting to a telephone line.

In another embodiment, the interest level can be sent directly from the supplementary decoder 518 to the data collection entity 526 using a direct communication link 528. The direct communication link 528 can be a dedicated cable linking the supplementary decoder 518 to the data collection entity 526 or an Internet connection. Thus, the supplementary decoder 518 is integrated with or linked to a modem (not shown) to facilitate the data communication.

Figure 5B:
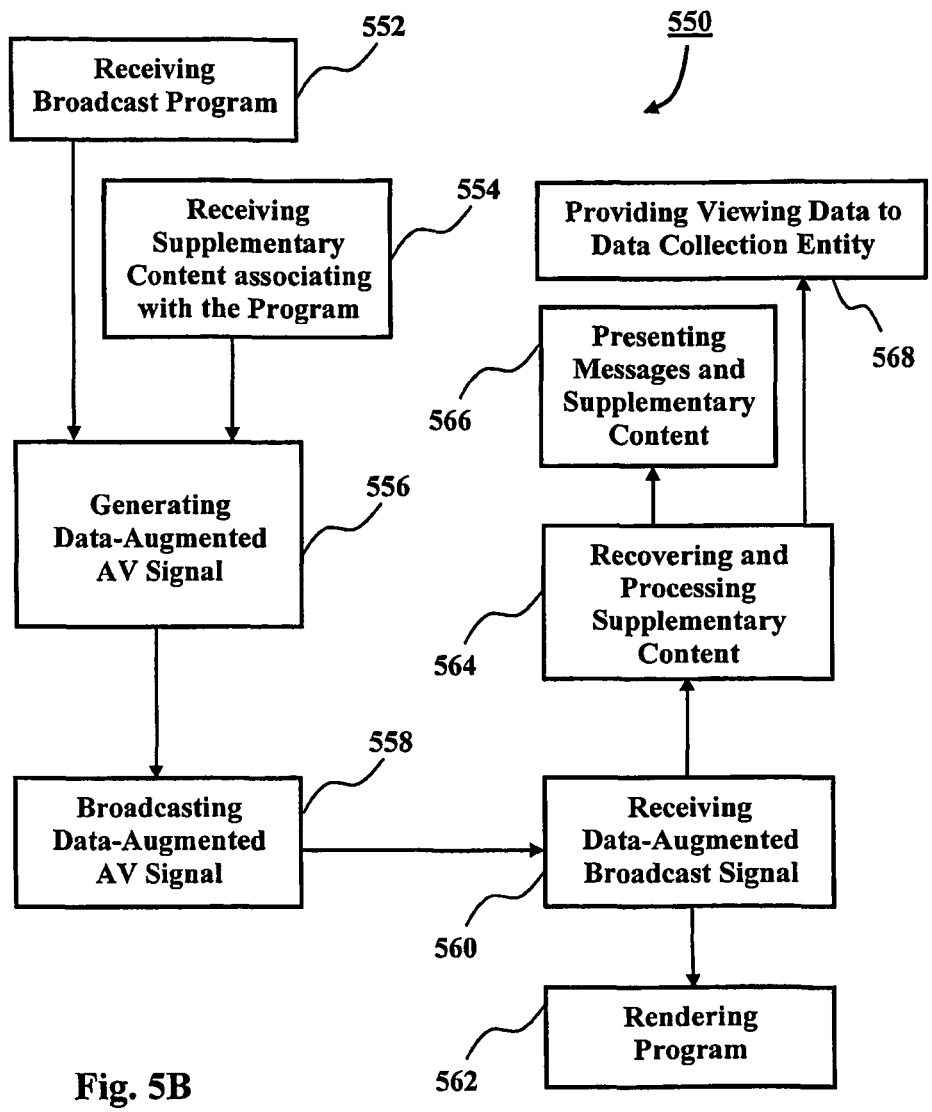
FIG. 5B illustrates a method of measuring an interest level of audience in a broadcast program and providing information based on the interest level in accordance with an embodiment of the present invention.

The method 550 of measuring the interest level of audience in a broadcast program and providing information based on the interest level is shown in FIG. 5B. The method 550 includes receiving an AV signal of a broadcast program in step 552 and supplementary content associating with the broadcast program in step 554. In an embodiment, the broadcast program is a television broadcast program. In another embodiment, the broadcast program is a radio broadcast program. The broadcast program can be any information such as movies, news, sports, current affairs, and the like information typically broadcast. The supplementary content can be any information associating with the broadcast program which the audience may be interested in. In particular, the supplementary content includes information relating to the broadcast program (i.e. the program information document) and summaries (i.e. program summary document) on different segments of the broadcast program. The supplementary content can also include other information relating to the broadcast program as described in the foregoing. The supplementary content can be provided in the form of an XML-type document (structured document) which includes a meta-data portion and a data portion as described in the foregoing. In a multiple supplementary contents environment, the different supplementary contents are distinguished by providing identifying information in the meta-data portion. For example, in an embodiment where monitoring broadcast program viewing by audience members is desired, the supplementary content includes a tag such as "Program=FRIENDS", for identifying the broadcast program in the meta-data portion. Further, information relating to the broadcast program segments or episodes (e.g. a summary or still frame pictures from the episode) can be provided in the data portion of the supplementary content. Therefore, multiple supplementary contents can be provided and received in step 554. The tags carried in each supplementary content are small in size. As such, the tags can be sent at a regular interval acting as a type of heart beat for monitoring the viewing of the broadcast program at the receiver end.

The supplementary content is combined with the non-program portion (e.g. VBI) of the AV signal to provide a data-augmented AV signal in step 556. The data-augmented AV signal is subsequently modulated with a carrier (broadcast) signal using known modulating techniques to provide a transmit signal for broadcasting to conventional receivers in step 558. The data-augmented AV signal has the same format as the original AV signal. Thus, the data-augmented AV signal can be treated, broadcast and received in the same manner as a conventional television (or radio) broadcast signal.

In an embodiment, the supplementary content is inserted into the VBI of the AV signal as it is received in step 556. The supplementary content is combined with a specific non-program portion segment of the AV signal to closely reside with the specific program-portion segment of the broadcast program. For example, if a supplementary content is closely related to a segment of the broadcast program, the supplementary content is combined with the non-program portion adjacent to the program portion of the related segment of the broadcast program. In another embodiment, the supplementary content is combined with the broadcast program at a pre-determined interval. Thus, there is synchronization between the segments of the broadcast program with the supplementary contents. In this way, at the receiver end, the audience is presented with the option to download the supplementary content at the appropriate time when the audience is most influenced by the program content segment.

At the receiver end, the transmit signal is received by a conventional receiver in step 560. The conventional receiver processes the transmit signal in the conventional manner. Typically, step 560 includes demodulating the transmit signal to provide a base-band signal (i.e. the data-augmented AV signal) which contains the program content and the supplementary content. In the case where the transmit signal is a radio signal, the conventional receiver is a radio receiver and it retrieves the program content from the base-band signal and renders the program content to the listener in audio form. In the case where the transmit signal is a television signal, the conventional receiver is a television receiver and it renders the program content on the television screen. The act of rendering the program content is performed in step 562, a process well known in the art.

At substantially the same time of rendering the program content, the base-band signal is output to a supplementary decoder in step 564. The supplementary decoder retrieves the supplementary content from the base-band signal as described in the foregoing with reference to FIGS. 3A, 4, 5A, and 6. In step 564, the supplementary content is further processed by the program monitoring application 602 as described in the foregoing with reference to FIGS. 5A and 6.

The program monitor application 602 scans the meta-data portion of the supplementary content for a tag identifying the broadcast program. Upon successfully detecting the tag, the program monitoring application 602 extracts program information (e.g. the sequence number) and updates a viewing record of the broadcast program, which is stored in a memory module of the supplementary decoder, as indicated by the tag. Similarly, if program summaries and other related information are also conveyed in the same supplementary content and a copy thereof is not previously stored in the memory module, a copy of the program summaries and other related information received is retained in the memory module of the supplementary decoder.

Once the relevant information is extracted from the supplementary content and appropriate updates are made, the program monitoring application 602 proceeds to check the viewing record to determine if there is any missing program sequence number. If a missing program sequence number is detected, the viewer may be alerted of the program segment not viewed. The alert messages and program summaries as described in the foregoing with reference to FIG. 5A can be presented to the viewer on the television screen, a display of the supplementary decoder or the electronic device in step 566. If the electronic device is a printer, the messages and summaries may be produced in hardcopy.

In another embodiment, in step 564, the program monitoring application 602 also computes the interest level of the audience in the broadcast program using one of the interest level equations (1) and (2) as described in the foregoing. If the interest level is found to reach a pre-set threshold, extra information or services can be provided to the audience. The interest level or viewing data can also be sent to a data collection entity in step 568. The act of sending the interest level to the data collection entity can be done by either using a communication infrastructure of the electronic device or via a direct link as described in the foregoing with reference to FIG. 5A.

In another embodiment, in step 568 at the data collection entity, (individual) interest levels received from different audience members can be aggregated to determine a group interest level for the program. One way of determining the group interest level for the program is to compute a weighted average of the individual interest levels. For example, for a weight of one, the group interest level equals the sum of the individual interest levels received divided by the number of individual interest levels received. If the individual interest level is received at regular intervals during the broadcasting of the program, the group interest level can also be computed at regular intervals. The computed group interest level can be posted on a web-server or fed directly to the broadcaster for broadcasting in step 554. This rating information can be used to alert the audience members when there is a large migration from one program or channel to another due to an important event, for example, a real life event, taking place.

As readily appreciated by those skilled in the art, the described processes may be implemented in hardware, software, firmware or a combination of these implementations as appropriate. For example, the processes of modulating and broadcasting signals may be carried out by hardware component modulators and transmitter systems operable to modulate and broadcast signals at the desired frequency and in the desired format. The described supplementary content processor or supplementary decoder may employ a combination of hardware front-end receiver components operable to additionally demodulate and/or condition the received supplementary content, and firmware/software operable to FEC decode the supplementary content and to store/process the resultant data as well as the output applications and device drivers. In addition, some or all of the described processes may be implemented as computer readable instruction code resident on a computer readable medium (removable disk, volatile or non-volatile memory, embedded processors, etc.), the instruction code operable to program a computer of other such programmable device to carry out the intended functions.

The foregoing description is presented for purposes of illustration and description. It is not intended to be exhaustive or to limit the invention to the precise form disclosed, and obviously many modifications and variations are possible in light of the foregoing description. The described embodiments are chosen in order to explain the principles of the invention and its practical application to thereby enable others skilled in the art to utilize the invention in various embodiments and with various modifications as are suited to the particular use contemplated. It is intended that the scope of the invention be defined by the claims appended hereto.

The invention claimed is:

1. A method comprising:
receiving a transmit signal at a receiver, the transmit signal including a program and a supplementary content associating therewith;
demodulating the transmit signal to provide a data-augmented signal;
recovering the supplementary content from the data-augmented signal at substantially the same time the program is rendered at the receiver;
determining an interest level of audience in the program; and
providing information relating to the program to an audience upon finding the interest level reaches a pre-determined level.

2. The method of claim 1 further comprising sending the interest level to a data collection entity.

3. The method of claim 2 further comprising determining a group interest level from the interest level received and providing the group interest level as a feedback to the audience.

4. The method of claim 1, wherein recovering the supplementary content comprises outputting the data-augmented signal to a decoder for extracting the supplementary content therefrom, the supplementary content is for containing information relating to the program and includes a tag for identifying the program.

5. The method of claim 4 further comprising retrieving a program sequence number from the supplementary content and storing the same in a viewing record of the program as identified by the tag, the program sequence number corresponds to a program segment.

6. The method of claim 5 further comprising providing information to an audience, the information being extra information relating to the program segment associating with the program sequence number in the viewing record.

7. The method of claim 5, wherein determining the interest level comprises checking the viewing record for the number of program sequence numbers received and computing a percentage for the received program sequence numbers out of a total number of program sequence numbers receivable for the program to provide the interest level.

8. The method of claim 7, wherein computing the percentage further comprising including a weighted factor to the computed percentage for an interactive activity performed by an audience at the receiver, the interactive activity includes obtaining information relating to the program during the rendering of the program.

9. The method of claim 8, wherein obtaining the information includes obtaining at least one of a ring-tone, picture, video clip, text, and a summary on a program segment.

10. The method of claim 7 wherein the information is extra information in connection with the program.

11. The method of claim 10, wherein the extra information comprises at least one of information on locations, persons, animals, or items shown in the program, discount vouchers, sequels to the program, programs in the same genre as the program, and information deemed desirable to the audience.

12. The method of claim 1 further comprising:
combining the supplementary content with an AV signal of the program to provide the data-augmented signal, wherein the supplementary content is inserted into a non-program portion of the AV signal; and
modulating the data-augmented signal with a carrier signal to provide the transmit signal for broadcasting.

13. The method of claim 12, wherein combining the supplementary content comprises inserting the supplementary content into the non-program portion of the AV signal at a regular interval, the non-program portion being a vertical or horizontal blanking interval of a television AV signal or a program associated data channel of a digital audio broadcast AV signal.

14. A system comprising:
a receiver for receiving a transmit signal and demodulating the same to provide a data-augmented signal, the transmit signal containing a program and a supplementary content relating thereto, the supplementary content includes a data portion for containing information and a meta-data portion having at least a tag for identifying the program; and
a decoder coupled to the receiver for receiving the data-augmented signal and recovering the supplementary content therefrom at substantially the same time the program is rendered at the receiver, the decoder includes a program monitoring application for determining an interest level of audience in the program and providing information relating to the program upon finding the interest level reaches a pre-determined level.

15. The system of claim 14, wherein the receiver comprises one of an analog television, a digital television, and a digital radio.

16. The system of claim 14 further comprising an electronic device coupled to the decoder for receiving the interest level and information therefrom.

17. The system of claim 16, wherein the electronic device comprises at least one of a printer, mobile phone, PC, and a PDA.

18. The system of claim 16, wherein the electronic device includes a communication infrastructure for conveying the interest level to a data collection entity.

19. The system of claim 14 further comprising:
an inserter for combining the supplementary content with an AV signal of the program to provide the data-augmented signal; and
a modulator for modulating the data-augmented signal with a carrier signal to provide the transmit signal for broadcasting.

20. The system of claim 19 further comprising a content server for storing and providing the supplementary content to the inserter.

21. The system of claim 20 further comprising a synchronizing signal between the content sever and the inserter for coordinating the combining process.

* * * * *